(12) United States Patent
Luke et al.

(10) Patent No.: US 9,715,206 B1
(45) Date of Patent: Jul. 25, 2017

(54) END-OF LIFE DETERMINATION FOR A PRINT CARTRIDGE

(71) Applicant: Hewlett-Packard Development Company, L.P., Houston, TX (US)

(72) Inventors: Jeffrey Harold Luke, Boise, ID (US); Michael Clinton Allyn, Boise, ID (US); William M. Smith, Boise, ID (US); Adam Michael Cole, Boise, ID (US); Jack Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/139,704

(22) Filed: Apr. 27, 2016

(51) Int. Cl.
*G03G 15/00* (2006.01)
*H04N 1/00* (2006.01)

(52) U.S. Cl.
CPC ....... *G03G 15/553* (2013.01); *H04N 1/00034* (2013.01); *H04N 1/00074* (2013.01)

(58) Field of Classification Search
CPC ............. G03G 15/553; H04N 1/00074; H04N 1/00034
See application file for complete search history.

(56) References Cited

U.S. PATENT DOCUMENTS

| | | | |
|---|---|---|---|
| 6,962,399 B2 | 11/2005 | Anderson et al. | |
| 7,146,114 B2 | 12/2006 | Frankel et al. | |
| 7,747,180 B2 | 6/2010 | Wittenauer et al. | |
| 9,134,675 B2 | 9/2015 | Yang et al. | |
| 2003/0063311 A1 | 4/2003 | Covitt et al. | |
| 2004/0091275 A1* | 5/2004 | Matsuda | G03G 15/0849 399/27 |
| 2005/0254832 A1* | 11/2005 | Kumai | G03G 15/0863 399/12 |

(Continued)

FOREIGN PATENT DOCUMENTS

| | | | | |
|---|---|---|---|---|
| JP | 04006571 A | * | 1/1992 | |
| JP | 2002372848 A | * | 12/2002 | B41J 2/17566 |

OTHER PUBLICATIONS

Saripalli, Surya, "A Dynamic inventory optimization method applied to printer fleet management", Rochester Institute of Technology RIT Scholar Works, Sep. 1, 2011, 146 pages.

*Primary Examiner* — Francis Gray
(74) *Attorney, Agent, or Firm* — Brooks Cameron & Huebsch PLLC

(57) ABSTRACT

Example implementations relate to end-of-life determination for a print cartridge. For example, a print cartridge according to the present disclosure, may include a plurality of consumable components. Each of the plurality of consumable components may have an associated sensor to monitor use of the respective consumable component. The print cartridge may further include a memory including instructions executable by a processor to, for each of the plurality of consumable components, receive a past use value quantifying an amount and type of use of the respective consumable component, determine an end-of-life value for the respective consumable component using the past use value and a predetermined tuning factor for the respective consumable component, and determine an end-of-life value for the print cartridge based on the plurality of end-of-life values for the plurality of consumable components.

14 Claims, 3 Drawing Sheets

(56) References Cited

U.S. PATENT DOCUMENTS

| | | | |
|---|---|---|---|
| 2012/0027423 A1* | 2/2012 | Kawai | G03G 15/556 399/12 |
| 2012/0230730 A1* | 9/2012 | Ogino | G03G 15/553 399/119 |
| 2015/0003846 A1* | 1/2015 | Yang | G03G 15/556 399/27 |

* cited by examiner

END-OF LIFE DETERMINATION FOR A PRINT CARTRIDGE

BACKGROUND

A printing and/or imaging system may be comprised of a plurality of components. Because these components may be reduced or degraded according to the use thereof, they may be referred to as consumable components, which may be maintained and/or replaced. Some of these consumable components may be arranged and/or embodied in a print cartridge. Similarly, a print cartridge may be referred to as a consumable item, which may be maintained and/or replaced.

DETAILED DESCRIPTION

Figure 1:
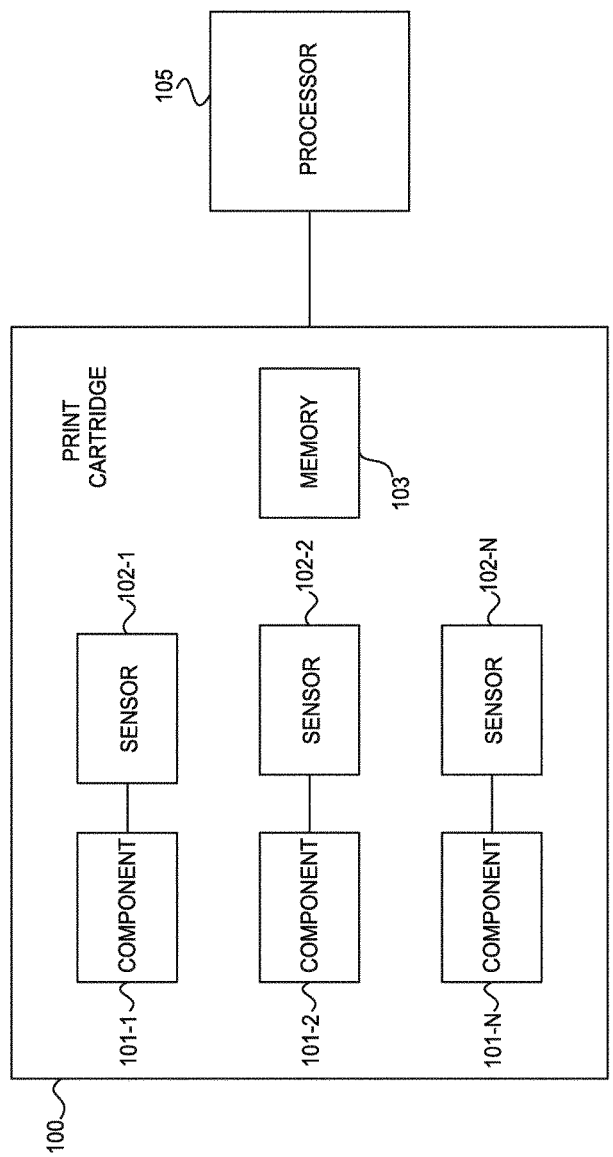
FIG. 1 illustrates a diagram of an example print cartridge, according to the present disclosure.

Accurately determining and reporting the end-of-life of a consumable may be valuable to users and maintenance personnel. For instance, accurately determining and reporting the end-of-life of a print cartridge in a laser printer may allow customers to replace the print cartridge before quality issues occur, while also reducing costs by not replacing the print cartridge too early. As used herein, the end-of-life of a consumable, such as a print cartridge, refers to a time, measured in temporal duration and/or number of tasks completed, after which the consumable will perform below a threshold level of acceptable performance. For instance, the end-of-life of a print cartridge may be associated with a time when all of the toner in the print cartridge is used up. Examples are not so limited, however, and the end-of-life of the print cartridge may be determined by other means, as discussed herein.

However, some print cartridges, such as all-in-one printer cartridges, may consist of multiple components. These components may have different usable lives. For instance, a first component may have an end-of-life earlier in time and/or that is defined by a different set of factors than a second component. Further, there may be non-linear dependencies on usage of other components. For example, the end-of-life of the first component may be dependent on the use of the second component, but the relationship between the rate of use between the two may not be 1:1.

Furthermore, some methods of determining and reporting end-of-life of consumables may rely on linear boundaries defined by the end-of-life of individual components under a worst case usage condition. Such assumptions may result in poor correlation between reported end-of-life and actual end-of-life in other usage conditions. Put another way, such methods may incorrectly determine the end-of-life of the print cartridge, thereby causing incorrect reporting to a user, and/or waste of consumables that are disposed of too soon.

Also, end-of-life notifications for supplies on some printing solutions may be set to a 'worst case' condition, in that an end-of-life notification may be generated, based on extreme usage of the consumable. Such practice may be used to ensure consistent product performance during reported life, and may result in many users receiving end-of-life notifications prematurely. Moreover, the toner level sensing mechanisms in such print cartridges may use an optical system to determine toner end of life, though, the effective range of the sensor may result in usable toner beyond the limit of what may be reported.

In contrast, end-of-life determination for a print cartridge, according to the present disclosure, allows for reporting expected end-of-life for the print cartridge by dynamically adjusting to current and past usage. As described further herein, individual tuning factors may be used to more accurately determine the end-of-life of the print cartridge. Moreover, as discussed herein, the end-of-life of the print cartridge may be determined by determining the end-of-life of each particular consumable component comprising the print cartridge. As described further herein, the method, system, and instructions described herein may be applied to existing products, thereby enabling significant cost reductions for consumables used in managed print environments.

FIG. 1 illustrates a diagram of an example print cartridge 100, according to the present disclosure. As illustrated in FIG. 1, the print cartridge 100 may comprise a plurality of consumable components, 101-1, 101-2, . . . , 101-N (referred to herein as the plurality of consumable components 101). As used herein, a consumable component refers to a component of the print cartridge 100 that may be reduced and/or degraded and therefore may need maintenance and/or replacement after some period of use. Examples of consumable components described herein may include a developer system, a photo conductor drum, and/or a marking material, among other examples. The developer system may also include a plurality of components, such as a developer roller, and a printing agent transfer pad such as a foam transfer pad. The developer system may also include a particle surface agent or particle carrier mechanism. In some examples, the photoconductor drum may include an organic photoconductor drum, and the marking material may include printing materials such as toner.

Each of the plurality of consumable components 101 may have an associated sensor 102-1, 102-2 . . . 102-N (referred to herein as sensors 102) to monitor use of the respective consumable component, and a memory 103 including instructions executable by a processor 105. The memory 103 may include instructions to, for each of the plurality of consumable components 101, receive a past use value quantifying an amount and type of use of the respective consumable component. That is, one type of print job may use more or less resources within the print cartridge than another type of print job. The memory 103 may receive from component 101-1, a past use value quantifying an amount and a type of use for component 101-1. Similarly, memory 103 may receive from component 101-2, a past use value quantifying an amount and a type of use for component 101-2.

The memory 103 may determine an end-of-life value for the respective consumable component using the past use value and a predetermined tuning factor for each respective consumable component. For example, memory 103 may determine an end-of-life value for component 101-1, an end-of-life value for component 101-2, and an end-of-life value for component 101-N. That is, each of component 101-1, 101-2, and 101-N may have a different tuning factor. As used herein, a tuning factor refers to a value and/or equation that identifies a number of print job types that may be performed and/or a number of sheets that may be printed with that particular component before the quality of print reaches a threshold level of performance. Each of the plurality of tuning factors may be predetermined, in that they are determined by testing and/or product performance by the manufacturer. Moreover, each of the plurality of tuning factors may be stored in a lookup table on memory 103 and/or on another location within print cartridge 100. The tuning factors may be dependent on actual product performance, and therefore may be stored as encrypted values on the memory 103. However, examples are not so limited, and the tuning factors may be stored in other regions of the print cartridge 100, and/or in other regions of the printing system, as described further herein. Examples are not so limited, and the tuning factors may be stored using security processes other than encryption, and/or may be stored without encryption.

The memory 103 may determine an end-of-life value for the print cartridge 100 based on the plurality of end-of-life values for the plurality of consumable components 101. The memory 103 may store instructions, such as, in the form of firmware, which are executed at each change of consumable component state. That is, the memory 103 may execute instructions to determine the end-of-life of the print cartridge when the percent life remaining for individual consumable components within the print cartridge change. For example, the memory 103 may determine an end-of-life value for the print cartridge based on an end-of-life value determined for each of component 101-1, 101-2, and 101-N.

Also, the memory 103 may determine when multiple thresholds of use have been met for the print cartridge 100. For instance, the memory 103 may determine a first end-of-life value for the print cartridge 100, such as a value indicating that the print cartridge 100 is "very low". However, the memory 103 may delay the "very low" message from occurring at the original point. The memory 103 may include instructions executable by the processor 105 to determine when a threshold amount of use of the print cartridge 100 has been met, and determine a second end-of-life value for the print cartridge 100 in response to determining that the threshold amount of use has been met. For instance, the memory 103 may determine when the "very low" threshold will be met, indicating that the end-of-life of the print cartridge is nearing. The memory 103 may further determine that a threshold amount of use of the print cartridge has passed, for instance, 10% of the use of the print cartridge, and the end-of-life of the print cartridge may be re-determined, resulting in the second end-of-use value. The second end-of use value may be more, less, or the same as the first end-of-life value.

As described herein, the end-of-life determination for the print cartridge may be dynamic, in that the end-of-life may be calculated at a number of different stages. At each determination cycle, the print cartridge, e.g., using memory 103, may use the tuning factors to calculate additional pages which could be printed and/or print jobs that could be performed before reaching an unacceptable print quality for each of the individual components in the print cartridge. That is, each of the individual consumable components 101 may have a threshold level that indicates the end-of-life for the particular consumable component. The memory 103 may store these values, and compare the determined end-of-life values for the consumable components with previously stored values at each calculation interval. The memory 103 may takes the lowest end-of-life values and continue the end-of-life determination until at least one consumable component is not able to print any additional pages and/or perform any additional print jobs. At that point, the "very low" message is may be displayed, indicating that the print cartridge may be replaced. As used herein, a "very low" message refers to a message, flag, alert, pop-up, indicator, and/or other message indicating to a user that the print cartridge is near or at it's end-of-life and may be replaced.

Figure 2:
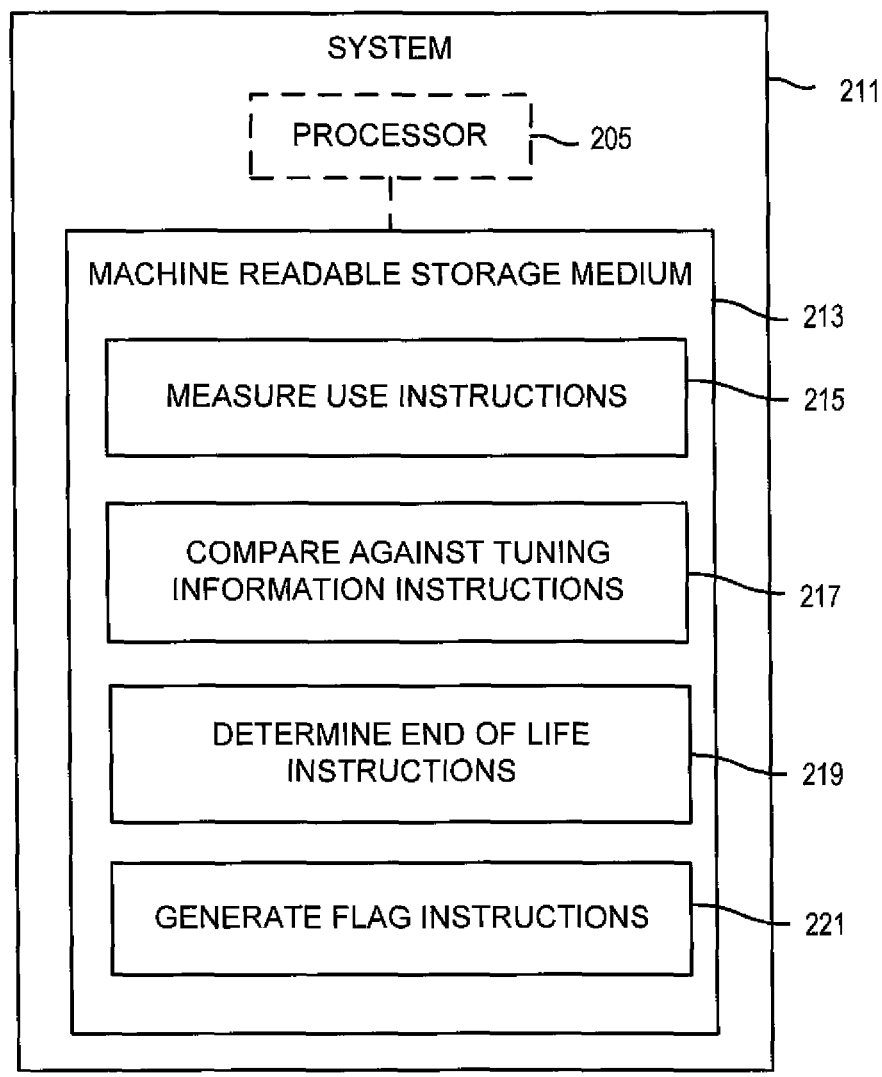
FIG. 2 is a block diagram of an example system for end-of-life determination for a print cartridge, according to the present disclosure.

FIG. 2 is a block diagram of an example system 211 for end-of-life determination for a print cartridge, according to the present disclosure. System 211 may include at least one computing device that is capable of communicating with at least one remote system. In the example of FIG. 2, system 211 includes a processor 205 and a machine-readable storage medium 213. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 205 may be one or more central processing units (CPUs), microprocessors, and/or other hardware devices suitable for retrieval and execution of instructions stored in machine-readable storage medium 213. In the particular example shown in FIG. 2, processor 205 may receive, determine, and send instructions 215, 217, 219, and 221 for end-of-life determination for a print cartridge. As an alternative or in addition to retrieving and executing instructions, processor 205 may include one or more electronic circuits comprising a number of electronic components for performing the functionality of one or more of the instructions in machine-readable storage medium 213. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 213 may be any electronic, magnetic, optical, or other physical storage device that stores executable instructions. Thus, machine-readable storage medium 213 may be, for example, Random Access Memory (RAM), an Electrically-Erasable Programmable Read-Only Memory (EEPROM), a storage drive, an optical disc, and the like. Machine-readable storage medium 213 may be disposed within system 211, as shown in FIG. 2. In this situation, the executable instructions may be "installed" on the system 211. Additionally and/or alternatively, machine-readable storage medium 213 may be a portable, external or remote storage medium, for example, that allows system 211 to download the instructions from the portable/external/remote storage medium. In this situation, the executable instructions may be part of an "installation package". As described herein, machine-readable storage medium 213 may be encoded with executable instructions for end-of-life determination for a print cartridge.

Referring to FIG. 2, measuring instructions 215, when executed by a processor (e.g., 205), may cause system 211 to measure an amount and type of use of a printing cartridge comprising a plurality of consumable components, where the printing cartridge has a predetermined end-of-life threshold. For instance, as discussed with regard to FIG. 1, the print cartridge (e.g., 100) may have a predetermined end-of-life threshold, at which a "very low" flag may be displayed. By measuring how, and how much, each of the individual components is used, a more accurate end-of-life determination may be made.

Comparing tuning information instructions 217, when executed by a processor (e.g., 205), may cause system 211 to compare, for each of the plurality of consumable components, the amount and type of use against tuning information stored on the processor. As used herein, tuning information includes the tuning factors, and may or may not include additional information for determining an end-of-life value for the print cartridge and/or the consumable components. As discussed with regard to FIG. 1, the use information may be compared against tuning information in memory (e.g., memory 100) or elsewhere in the printing system. Put another way, the instructions to compare, for each of the plurality of consumable components, the amount and type of use against the tuning information, may include instructions executable by the processor to calculate an adjusted end-of-life expectancy for a first consumable component among the plurality of consumable components.

In some examples, the plurality of consumable components may include a developer system, a photoconductor drum, and marking material such as toner. The developer system may comprise a developer roller, a printing agent transfer pad, and a surface agent. However, the developer system may include more or fewer components than those listed herein.

The determining end of life instructions 219, when executed by a processor (e.g., 205), may cause system 211 to determine an adjusted end-of-life threshold for the printing cartridge based on the comparison. Put another way, the amount and type of use for each consumable component may be used to determine an end-of-life value for each respective consumable component, and the adjusted end-of-life for the print cartridge may be determined using the end-of-life values for the consumable components. Furthermore, the instructions to calculate the adjusted end-of-life expectancy for the first consumable component may include instructions to quantify the amount and the type of use for the first consumable component, and applying an algorithm to the quantified amount using a predetermined tuning factor associated with the consumable component.

As discussed herein, the processor 205 may execute instructions stored in machine-readable storage medium 213 to generate a flag to be displayed for a user, indicating that the adjusted end-of life threshold has been met.

In some examples, the instructions to determine the adjusted end-of-life instructions 219 include instructions to determine, based on the measured use, that each of the plurality of consumable components has a respective end-of-life threshold that is later in time than the predetermined end-of-life threshold of the print cartridge. For example, a number of pages and/or a number of print jobs may initially define the end-of-life of the print cartridge, but the actual use of the print cartridge (and consumable components comprising it) may result in a determination that each of the consumable components has an end-of-life that is later in time (in terms of temporal time and/or print jobs) than the predetermined end-of-life of the print cartridge. As such, the predetermined end-of-life threshold for the print cartridge may be adjusted based on the end-of-life thresholds for the plurality of consumable components. Put another way, if each of the consumable components (e.g., components 101) has an end-of-life later than the predetermined end-of-life of the print cartridge, then the end-of-life of the print cartridge may be adjusted to reflect the earliest end-of-life of the consumable components.

Additionally and/or alternatively, the instructions to determine the adjusted end-of-life threshold 219 may include instructions to determine, based on the measured use, that at least one of the plurality of consumable components has a respective end-of-life threshold that is earlier in time than the predetermined end-of-life threshold of the print cartridge. For instance, based on the actual use of the print cartridge (and the consumable components), at least one of the consumable components may have an end-of-life threshold that is earlier in time (in terms of temporal time and/or print jobs) than the predetermined end-of-life of the print cartridge. In such examples, the predetermined end-of-life threshold may be adjusted for the print cartridge based on the end-of-life thresholds for the plurality of consumable components.

Figure 3:
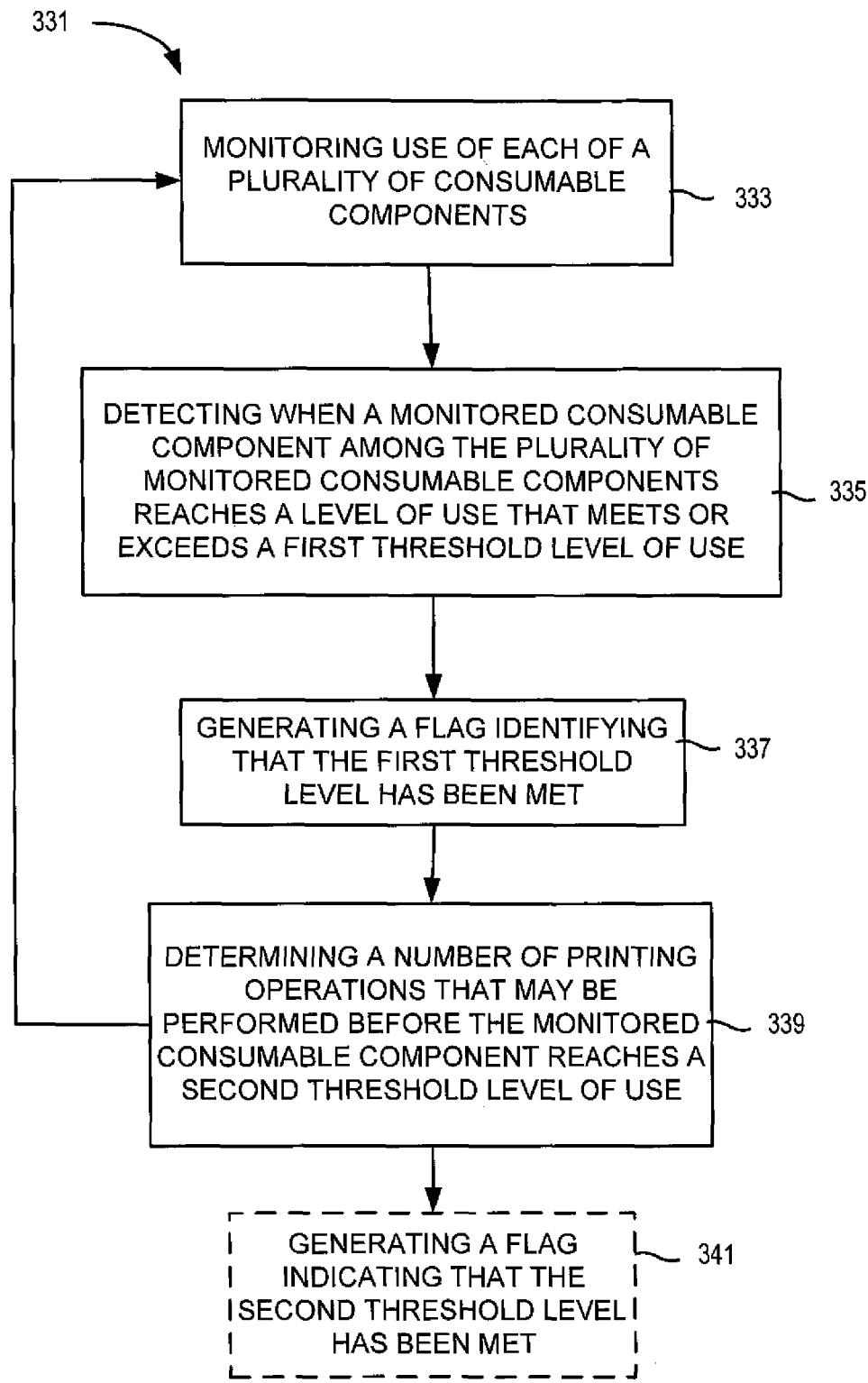
FIG. 3 illustrates an example method for end-of-life determination for a print cartridge, according to the present disclosure.

FIG. 3 illustrates an example method 331 for end-of-life determination for a print cartridge, according to the present disclosure. At 333, the method 331 may include monitoring use of each of a plurality of consumable components of a printing cartridge, as discussed in regards to FIGS. 1 and 2.

At 335, the method 331 may include detecting when a monitored consumable component among the plurality of monitored consumable components reaches a level of use that meets or exceeds a first threshold level of use. For example, after an amount of time and/or a number of print jobs have been completed, the end-of-life determination processes described in regard to FIGS. 1 and 2 may be performed. In some examples, the first threshold may be a predetermined end-of-life of the print cartridge, although examples are not so limited, and the first threshold may also be a point at which usage values are obtained from each of the consumable components.

At 337, the method 331 may include generating a flag identifying that the first threshold level has been met. That is, the flag may indicate that the print cartridge and/or consumable components within the print cartridge have reached a particular level of use, such as "almost out", "very low", or "replace soon" among others. Examples are not so limited, however, and the flag may assume other forms than those listed herein.

At 339, the method 331 may include determining a number of printing operations that may be performed before the monitored consumable component reaches a second threshold level of use, by applying a tuning factor to the level of use of the monitored consumable component. For example, as described in relation to FIGS. 1 and 2, a particular algorithm may be applied to each consumable component using the tuning factor, such that the end-of-life value for each consumable component may be determined based on actual past use of the consumable component.

In some examples, the method 331 may include determining that the second threshold level of use for the monitored consumable component is reached, and determining that the printing cartridge has reached an end-of-life threshold in response to the determination that the second threshold is reached. For instance, based on the determined end-of-life values for the consumable components, the end-of-life threshold for the print cartridge may be revised. As described herein, the adjusted end-of-life of the print cartridge may be earlier than, later than, or the same as, the predetermined end-of-life of the print cartridge.

In some examples, method 331 may further comprise monitoring use of each of the plurality of consumable components after the first flag is generated, and detecting when a second monitored consumable component among the plurality of monitored consumable components reaches a third threshold level of use after the first flag is generated. For instance, a print cartridge may have a predetermined end-of-life of a particular value (X). However, based on the use of the photo conductor drum, the end-of-life of the print cartridge may have a shorter end-of-life value, such as X-Y, resulting in the first threshold level of use. After the first threshold level of use is determined, if the use of the photo conductor drum changes such that the photo conductor drum is being used at a lesser rate, but the use of the developer system changes such that the developer system is being used at a greater rate, the third threshold level of use may be determined.

As described herein, a first threshold level of use of a print cartridge, and/or a consumable component, may refer to a "very low" or "almost out" type of flag. Similarly, the second threshold level of use for the monitored consumable component may correspond to an end-of-life threshold for the printing cartridge. The method 331 may comprise, determining that the end-of-life threshold for the printing cartridge is met when another monitored consumable component among the plurality of monitored consumable components reaches a third threshold level of use before the second threshold level is met. For example, if the end-of-life of the print cartridge was determined based on average use, but subsequent to such determination, the print cartridge is used in extreme circumstances, or used very heavily, then the determined end-of-use for the print cartridge would likely change. Although, as described herein, the rate at which the print cartridge would reach end-of-life may be dependent on the type and amount of use of each of the consumable components. Put another way, if the developer system is used in an ordinary manner, but the marking material is used in extreme quantities, then the print cartridge may have a shorter end-of-life due to the shorter end of life of the marking material. In another example, if the photo conductor drum is used in an ordinary manner, and the developing system is used in extreme quantities, then the print cartridge may have a shorter end-of-life due to the shorter end of life of the developing system.

Moreover, the method 331 may include retrieving the tuning factor from a lookup table comprising a plurality of tuning factors, each of the plurality of tuning factors associated with a different respective consumable component of the plurality of consumable components. As described in relation to FIGS. 1 and 2, the tuning factors may be stored in memory, encrypted or not encrypted, in a lookup table for determination of end-of-life for the print cartridge. Also, as described herein, the lookup table may be stored outside of the print cartridge, such as in the printing device itself.

Also, at 341, the method 331 may include generating a flag indicating that the second threshold has been met. Such flag may indicate that the user must replace the print cartridge at that time. As such, once the print cartridge is replaced, the method 331 may repeat itself, as illustrated in the feedback loop in FIG. 3.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A print cartridge comprising:
   a plurality of consumable components, wherein each of the plurality of consumable components has an associated sensor to monitor use of the respective consumable component; and
   a memory including instructions executable by a processor to, for each of the plurality of consumable components:
   receive a past use value quantifying an amount and type of use of the respective consumable component;
   determine an end-of-life value for the respective consumable component using the past use value and a predetermined tuning factor for the respective consumable component; and
   determine an adjusted end-of-life value for the print cartridge based on the plurality of end-of-life values for the plurality of consumable components, wherein the instructions to determine the adjusted end-of-life value for the print cartridge includes instructions to:
   determine, based on a measured use, that each of the plurality of consumable components has a respective end-of-life threshold that is later in time than a predetermined end-of-life threshold of the print cartridge; and
   adjust the predetermined end-of-life threshold for the print cartridge based on the end-of-life thresholds for the plurality of consumable components.

2. The print cartridge of claim 1, wherein the end-of-life value for the print cartridge is a first end-of-life value for the print cartridge, and wherein the memory includes instructions executable by the processor to:
   determine when a threshold amount of use of the print cartridge has been met; and
   determine a second end-of-life value for the print cartridge in response to determining that the threshold amount of use has been met.

3. The print cartridge of claim 1, wherein the plurality of predetermined tuning factors are stored as a plurality of encrypted values on the memory.

4. A non-transitory computer-readable medium containing instructions executable by a processor to:
   measure an amount and type of use of a printing cartridge comprising a plurality of consumable components, wherein the printing cartridge has a predetermined end-of-life threshold;
   compare, for each of the plurality of consumable components, the amount and type of use against tuning factors stored on the processor;
   determine an adjusted end-of-life threshold for the printing cartridge based on the comparison wherein the instructions to determine the adjusted end-of-life threshold for the printing cartridge based on the comparison includes instructions to:
  determine, based on the measured use of the printing cartridge, that each of the plurality of consumable components has a respective end-of-life threshold that is later in time than the predetermined end-of-life threshold of the print cartridge; and
  adjust the predetermined end-of-life threshold for the print cartridge based on the end-of-life thresholds for the plurality of consumable components; and
  generate a flag to be displayed for a user, indicating that the adjusted end-of life threshold has been met.

5. The non-transitory computer-readable medium of claim 4, wherein the plurality of consumable components includes a developer system, the developer system comprising at least one of:
  a developer roller;
  a printing agent transfer pad; and
  a particle surface agent or particle carrier mechanism.

6. The non-transitory computer-readable medium of claim 5, wherein the developer system comprises a marking material.

7. The non-transitory computer-readable medium of claim 4, wherein the plurality of consumable components includes a photo conductor drum.

8. The non-transitory computer-readable medium of claim 4, wherein the instructions to compare, for each of the plurality of consumable components, the amount and type of use against the tuning factors, include instructions executable by the processor to:
  calculate an adjusted end-of-life expectancy for a first consumable component among the plurality of consumable components.

9. The non-transitory computer-readable medium of claim 8, wherein the instructions to calculate the adjusted end-of-life expectancy for the first consumable component include instructions to:
  quantify the amount and the type of use measured for the first consumable component; and
  apply an algorithm to the quantified amount using a predetermined tuning factor associated with the consumable component.

10. The non-transitory computer-readable medium of claim 4, wherein the instructions to determine the adjusted end-of-life threshold include instructions to:
  determine, based on the measured use, that at least one of the plurality of consumable components has a respective end-of-life threshold that is earlier in time than the predetermined end-of-life threshold of the print cartridge; and
  adjust the predetermined end-of-life threshold for the print cartridge based on the end-of-life thresholds for the plurality of consumable components.

11. A method comprising:
monitoring use of each of a plurality of consumable components of a printing cartridge;
detecting when a monitored consumable component among the plurality of monitored consumable components reaches a level of use that meets or exceeds a first threshold level of use;
generating a flag identifying that the first threshold level has been met; and
determining a number of printing operations that may be performed before the monitored consumable component reaches a second threshold level of use by applying a tuning factor to the level of use of the monitored consumable component, wherein:
  the second threshold level of use corresponds to an end-of-life threshold for the printing cartridge; and
  the end-of-life threshold is met when another monitored consumable component among the plurality of monitored consumable components reaches a third threshold level of use before the second threshold level is met.

12. The method of claim 11, comprising:
determining that the second threshold level of use for the monitored consumable component is reached; and
determining that the printing cartridge has reached an end-of-life threshold in response to the determination that the second threshold is reached.

13. The method of claim 11, wherein the monitored consumable component is a first monitored consumable component, the method further comprising:
  monitoring use of each of the plurality of consumable components after the first flag is generated; and
  detecting when a second monitored consumable component among the plurality of monitored consumable components reaches a third threshold level of use after the first flag is generated.

14. The method of claim 11, wherein applying the tuning factor includes retrieving the tuning factor from a lookup table comprising a plurality of tuning facts, each of the plurality of tuning factors associated with a different respective consumable component of the plurality of consumable components.

* * * * *